United States Patent
Imai et al.

(10) Patent No.: US 9,969,627 B2
(45) Date of Patent: May 15, 2018

(54) LIQUID TREATMENT APPARATUS AND LIQUID TREATMENT METHOD

(71) Applicant: Panasonic Intellectual Property Management Co., Ltd., Osaka (JP)

(72) Inventors: Shin-Ichi Imai, Osaka (JP); Masaki Fujikane, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 740 days.

(21) Appl. No.: 14/516,917

(22) Filed: Oct. 17, 2014

(65) Prior Publication Data

US 2015/0114913 A1    Apr. 30, 2015

(30) Foreign Application Priority Data

Oct. 25, 2013 (JP) ................................ 2013-222550

(51) Int. Cl.
*C02F 1/46* (2006.01)
*C02F 1/467* (2006.01)

(52) U.S. Cl.
CPC ............ *C02F 1/467* (2013.01); *C02F 1/4608* (2013.01); *C02F 2201/4619* (2013.01); *C02F 2305/023* (2013.01)

(58) Field of Classification Search
CPC .... C02F 1/46; C02F 1/469; C02F 1/78; C02F 101/10; C02F 101/30
See application file for complete search history.

(56) References Cited

U.S. PATENT DOCUMENTS

| | | | |
|---|---|---|---|
| 2002/0008014 A1 | 1/2002 | Adachi et al. | |
| 2011/0017610 A1* | 1/2011 | Hahn | C02F 1/4672 205/746 |
| 2014/0014516 A1* | 1/2014 | Kumagai | C02F 1/4608 204/556 |
| 2014/0054242 A1 | 2/2014 | Imai | |
| 2015/0259203 A1* | 9/2015 | Costello | C01B 13/11 204/176 |

FOREIGN PATENT DOCUMENTS

| | | |
|---|---|---|
| CN | 101074127 | 11/2007 |
| CN | 101795979 | 8/2010 |

(Continued)

OTHER PUBLICATIONS

English Translation of Chinese Search Report dated Jan. 12, 2016 for the related Chinese Patent Application No. 201410562683.X.

*Primary Examiner* — Walter D. Griffin
*Assistant Examiner* — Cameron J Allen
(74) *Attorney, Agent, or Firm* — McDermott Will & Emery LLP

(57) ABSTRACT

A liquid treatment apparatus for treating water to be treated, according to the present disclosure, includes a treatment tank, a dielectric partition wall dividing inside of the treatment tank into a first space in which the water to be treated is injected, and a second space in which an electrolytic solution is filled, a first electrode at least part of which is arranged in the first space of the treatment tank, a second electrode at least part of which is arranged in the second space of the treatment tank, and a power supply that applies a high-frequency AC voltage between the first electrode and the second electrode.

19 Claims, 8 Drawing Sheets

(56) References Cited

FOREIGN PATENT DOCUMENTS

| | | |
|---|---:|---:|
| JP | 6-015789 U | 3/1994 |
| JP | 7-008956 | 1/1995 |
| JP | 10-076269 | 3/1998 |
| JP | 2002-159973 | 6/2002 |
| JP | 2004-268003 | 9/2004 |
| JP | 2005-103442 | 4/2005 |
| JP | 2006-212607 | 8/2006 |
| JP | 2007-207540 | 8/2007 |
| JP | 2009-022885 | 2/2009 |
| JP | 2009-255027 | 11/2009 |
| JP | 4784624 | 10/2011 |
| JP | 2012-075973 | 4/2012 |
| JP | 2012-075981 | 4/2012 |
| JP | 2012-135614 | 7/2012 |
| JP | 2013-000716 | 1/2013 |
| JP | 2013-150975 | 8/2013 |
| WO | 2012/157034 | 11/2012 |

* cited by examiner

LIQUID TREATMENT APPARATUS AND LIQUID TREATMENT METHOD

This application claims priority to Japanese Patent Application No. 2013-222550, filed on Oct. 25, 2013, the contents of which are hereby incorporated by reference.

BACKGROUND

1. Technical Field

The present disclosure relates to a liquid treatment apparatus and a liquid treatment method.

2. Description of the Related Art

A sterilizing apparatus for treating water to be treated, such as polluted water, with plasma is proposed. The specification of Japanese Patent No. 4784624, for example, discloses a sterilizing apparatus. In the sterilizing apparatus, a high voltage electrode and a grounding electrode are arranged in a treatment tank, with a space between both the electrodes, the treatment tank being full of water to be treated. In the proposed sterilizing apparatus, when a high-voltage pulse is applied between both the electrodes to cause discharge, plasma is generated in a gas bubble formed through an instantaneous boiling phenomenon, producing OH, H, O, $O_2^-$, $O^-$, and $H_2O_2$, which kills microorganisms and bacteria.

SUMMARY

Embodiments of the present disclosure, which are illustrative and not restrictive, provide a liquid treatment apparatus and a liquid treatment method for treating liquids with high efficiency.

According to one aspect of the present disclosure, there is provided a liquid treatment apparatus for treating water to be treated, the liquid treatment apparatus including a treatment tank, a dielectric partition wall dividing the inside of the treatment tank into a first space in which the water to be treated is injected, and a second space in which an electrolytic solution is filled, at least one first electrode at least part of which is arranged in the first space of the treatment tank, a second electrode at least part of which is arranged in the second space of the treatment tank, and a power supply that applies a high-frequency AC voltage between the first electrode and the second electrode.

The comprehensive and particular embodiments may be realized with optional combinations of various modifications of the liquid treatment apparatus and the liquid treatment method according to the present disclosure.

With the liquid treatment apparatus and the liquid treatment method according to the present disclosure, liquids can be treated with high efficiency.

Additional benefits and advantages of the disclosed embodiments will be apparent from the specification and drawings. The benefits and/or advantages may be individually provided by the various embodiments and features of the specification and drawings, and need not all be provided in order to obtain one or more of the same.

DETAILED DESCRIPTION OF THE EMBODIMENTS

Figure 1:
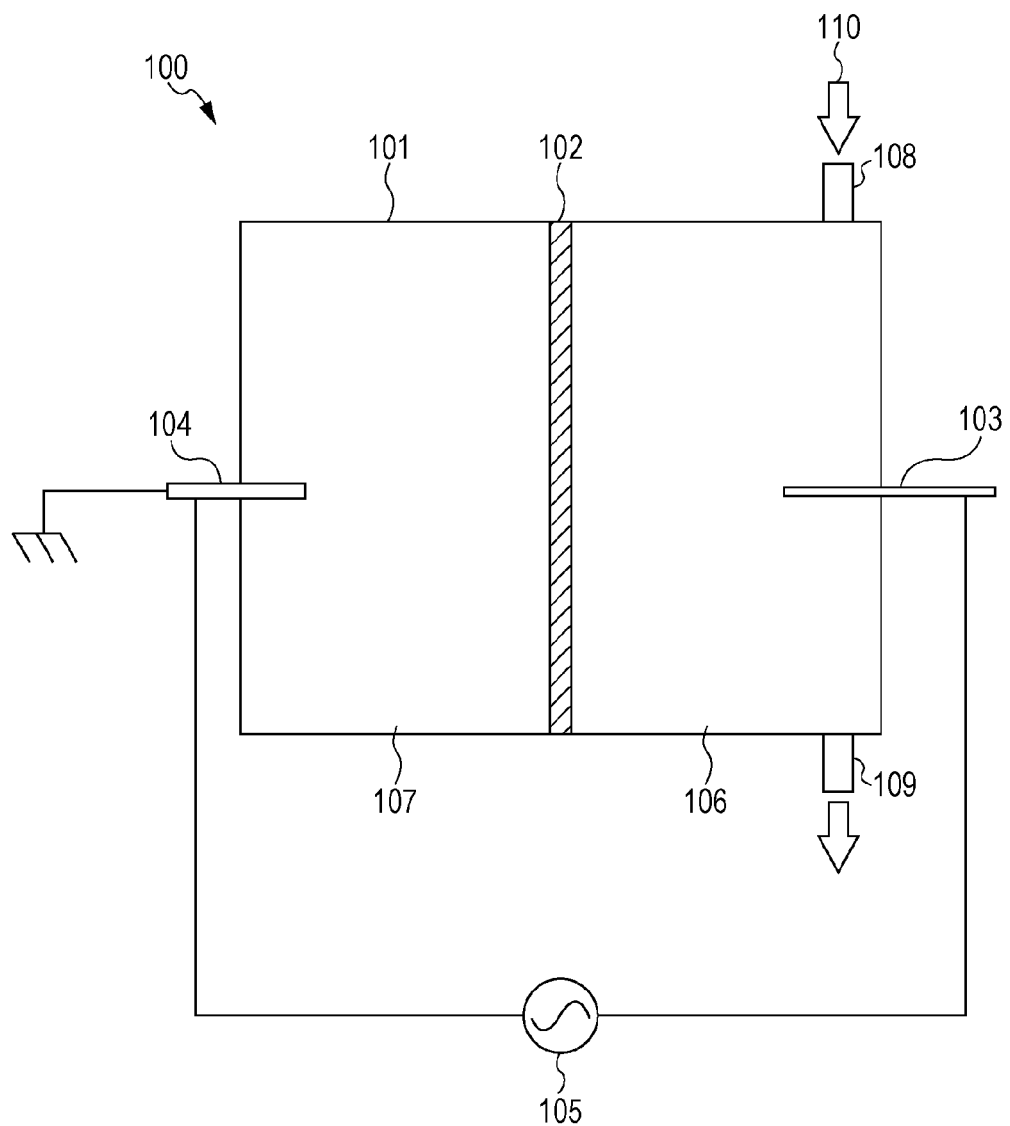
FIG. 1 is a schematic view illustrating one example of an overall configuration of a liquid treatment apparatus according to a first embodiment of the present disclosure.

A liquid treatment apparatus for treating water to be treated, according to a first aspect of the present disclosure, includes a treatment tank, a dielectric partition wall dividing the inside of the treatment tank into a first space in which the water to be treated is injected, and a second space in which an electrolytic solution is filled, at least one first electrode at least part of which is arranged in the first space of the treatment tank, a second electrode at least part of which is arranged in the second space of the treatment tank, and a power supply that applies a high-frequency AC voltage between the first electrode and the second electrode.

With the features described above, when the high-frequency AC voltage is applied between the first electrode and the second electrode from the power supply, radicals are produced in the water to be treated, while bacteria in the water to be treated are caused to adhere to a wall surface of the dielectric partition wall. Accordingly, the radicals produced in the water to be treated can be collided against the bacteria adhering to the wall surface of the dielectric partition wall with high efficiency, and thus the bacteria in the water to be treated can be killed in a short time.

The term "water to be treated" used in the present disclosure implies a liquid that is an object to be treated by the liquid treatment apparatus. The liquid treatment apparatus according to the first aspect of the present disclosure involves not only the apparatus in a state where the first space of the treatment tank is actually filled with the water to be treated, but also the apparatus including, in the treatment tank, the first space into which the water to be treated can be filled.

In a liquid treatment apparatus according to a second aspect of the present disclosure, for example, the dielectric partition wall may block off inflow of the water to be treated into the second space and inflow of the electrolytic solution into the first space.

In a liquid treatment apparatus according to a third aspect of the present disclosure, for example, the dielectric partition wall in the apparatus according to the first aspect may include a plurality of concave-convex portions in a wall surface thereof.

With the feature described above, when the high-frequency AC voltage is applied between the first electrode and the second electrode from the power supply, the electric field strength in the concave-convex portions can be increased by the so-called edge effect. In other words, when a portion where the electric field strength is large and a portion where the electric field strength is small are formed in the wall surface of the dielectric partition wall, the bacteria in the water to be treated are more apt to adhere to the wall surface of the dielectric partition wall. Accordingly, even when the water to be treated is in a turbulent state, for example, the bacteria in the water to be treated can be attracted to adhere to the dielectric partition wall, and thus the radicals can be collided against the bacteria adhering to the dielectric partition wall with high efficiency. As a result, even when the water to be treated is in the turbulent state, the bacteria in the water to be treated can be killed in a short time.

In a liquid treatment apparatus according to a fourth aspect of the present disclosure, for example, the second electrode in the apparatus according to the first or second aspect may be grounded.

With the feature described above, a DC self-potential is generated in the surface of the dielectric partition wall in a state capable of trapping the bacteria. Accordingly, the bacteria in the water to be treated can be killed in a shorter time.

In a liquid treatment apparatus according to a fifth aspect of the present disclosure, for example, the treatment tank in the apparatus according to any one of the first to third aspects may include an inlet through which the water to be treated is injected to the first space, and an outlet through which the water having been treated is drained from the first space.

With the feature described above, the water to be treated can be injected into the first space of the treatment tank through the inlet, and the water having been treated can be drained from the first space of the treatment tank through the outlet. Accordingly, bacteria in a large capacity of the water to be treated can be killed in a short time.

In a liquid treatment apparatus according to a sixth aspect of the present disclosure, for example, the inlet in the apparatus according to the fourth aspect may be arranged in a first surface of the treatment tank, and the outlet in the apparatus according to the fourth aspect may be arranged in a second surface of the treatment tank, the second surface opposing to the first surface, the outlet being located at a different position from an extension line extending from the inlet into a direction of injecting the water to be treated.

With the feature described above, the length of a flow passage from the inlet to the outlet can be increased. Accordingly, a probability of adhering of the bacteria, which are present in the water to be treated, to the dielectric partition wall can be increased. This enables a larger number of bacteria to be trapped in the flow passage from the inlet to the outlet. As a result, the radicals produced in the water to be treated can be collided against the bacteria adhering to the dielectric partition wall with high efficiency, and thus the bacteria in the water to be treated can be killed in a short time.

In a liquid treatment apparatus according to a seventh aspect of the present disclosure, for example, the treatment tank in the apparatus according to any one of the first to sixth aspects may include a gas bleeding hole in the second space.

With the feature described above, for example, when the electrolytic solution filling the second space of the treatment tank is vaporized, the gas bleeding hole allows the generated gas to be released to the outside of the treatment tank therethrough. Moreover, for example, when gas is generated from the vicinity of the second electrode, the gas bleeding hole further allows the generated gas to be released to the outside of the treatment tank therethrough. In other words, the gas bleeding hole can prevent the treatment tank from being damaged by the gas vaporized from the electrolytic solution and/or the gas generated from the vicinity of the second electrode. In addition, the gas bleeding hole can be used, for example, to inject the electrolytic solution into the second space of the treatment tank.

In a liquid treatment apparatus according to an eighth aspect of the present disclosure, for example, the at least one first electrode in the apparatus according to any one of the first to seventh aspects may comprise a plurality of first electrodes.

With the feature described above, the provision of the plural first electrodes can increase an amount of the radicals generated in the water to be treated. As a result, the radicals can be collided against the bacteria adhering to the dielectric partition wall with higher efficiency, and thus the bacteria in the water to be treated can be killed in a shorter time.

In a liquid treatment apparatus according to a ninth aspect of the present disclosure, for example, the power supply in the apparatus according to any one of the first to eighth aspects may apply a bipolar pulse voltage.

With the feature described above, the electrode lifetime is prolonged. Accordingly, a liquid treatment apparatus with higher quality can be provided.

In a liquid treatment apparatus according to a tenth aspect of the present disclosure, for example, the liquid treatment apparatus according to any one of first to ninth aspects may further comprise a gas supplying apparatus that supplies gas into the water to be treated from outside of the treatment tank, the water to be treated being present in the first space of the treatment tank.

With the feature described above, the gas supplying apparatus can increase the amount of gas in the water to be treated. As a result, the liquid treatment apparatus can produce the radicals with high efficiency.

In a liquid treatment apparatus according to an eleventh aspect of the present disclosure, for example, the gas supplying apparatus according to the tenth aspect may supply the gas into the water to be treated, generating a gas bubble that surrounds at least part of the first electrode.

With the features described above, plasma can be generated inside the gas bubble in the water to be treated, and thus radicals can be produced with high efficiency. Furthermore, when the high-frequency AC voltage is applied between the first electrode and the second electrode from the power supply, the bacteria in the water to be treated are attracted to adhere to the wall surface of the dielectric partition wall. Accordingly, the radicals can be collided against the bacteria adhering to the wall surface of the dielectric partition wall, and thus the bacteria in the water to be treated can be killed in a short time.

In a liquid treatment apparatus according to a twelfth aspect of the present disclosure, for example, at least part of the first electrode in the first space of the treatment tank according to the tenth aspect may include a region where a conductor surface thereof is exposed, and the gas bubble may surround the region of the first electrode.

With the feature described above, the radicals can be produced with high efficiency. Moreover, when the high-frequency AC voltage is applied between the first electrode and the second electrode from the power supply, the bacteria in the water to be treated are attracted to adhere to the wall surface of the dielectric partition wall. As a result, the radicals produced by the plasma can be collided against the bacteria adhering to the wall surface of the dielectric partition wall, and thus the bacteria in the water to be treated can be killed in a short time.

In a liquid treatment apparatus according to a thirteenth aspect of the present disclosure, for example, the liquid treatment apparatus according to the twelfth aspect may further include an insulator in contact with an outer peripheral surface of the first electrode, wherein the first electrode has a hollow cylindrical shape with an opening through which a hollow space defined by an inner peripheral surface of the first electrode communicates with the first space of the treatment tank, the gas supplying apparatus may supply the gas into the water to be treated through the hollow space and the opening of the first electrode, and the region of the first electrode may be not covered with the insulator.

With the features described above, since the first electrode is covered with any of the insulator and the gas bubble generated from the opening of the first electrode, the first electrode can be isolated from the water to be treated. By applying the high-frequency AC voltage between the first electrode and the second electrode from the power supply in the above-mentioned state, discharge tends to more readily occur in the gas bubble, whereby the plasma can be generated with higher efficiency.

In a liquid treatment apparatus according to a fourteenth aspect of the present disclosure, for example, the power supply in the apparatus according to the twelfth or thirteenth aspect may apply the high-frequency AC voltage between the first electrode and the second electrode, causing discharge in the gas bubble and generating plasma.

With the feature described above, radicals can be produced in the water to be treated while the plasma is generated with high efficiency. Furthermore, when the high-frequency AC voltage is applied between the first electrode and the second electrode from the power supply, the bacteria in the water to be treated are attracted to adhere to the wall surface of the dielectric partition wall. As a result, the radicals produced by the plasma can be collided against the bacteria adhering to the wall surface of the dielectric partition wall with high efficiency, and thus the bacteria can be killed in a short time.

In a liquid treatment apparatus according to a fifteenth aspect of the present disclosure, for example, the liquid treatment apparatus according to any one of the first to ninth aspects may further include an insulator surrounding a periphery of the first electrode with a gap between the insulator and the periphery of the first electrode, the insulator including an opening through which the gap communicates with the first space of the treatment tank.

With the features described above, when the high-frequency AC voltage is applied between the first electrode and the second electrode from the power supply, a liquid present in the gap between the first electrode and the insulator is vaporized to gas. Therefore, an amount of gas in the water to be treated can be increased, and thus the radicals can be produced with higher efficiency.

In a liquid treatment apparatus according to a sixteenth aspect of the present disclosure, for example, the power supply in the apparatus according to the fifteenth aspect may apply the high-frequency AC voltage between the first electrode and the second electrode, to vaporize a liquid in the gap to produce gas, and the application of the power supply causes discharge in a gas bubble to generate plasma, when the gas is let out as the gas bubble from the opening into the water to be treated, the water to be treated being present in the first space of the treatment tank.

With the feature described above, since the plasma is generated in the gas vaporized from the liquid, oxygen-based radicals containing a less amount of impurities can be produced. Furthermore, when the high-frequency AC voltage is applied between the first electrode and the second electrode from the power supply, the bacteria in the water to be treated are attracted to adhere to the dielectric partition wall. As a result, the radicals produced by the plasma can be collided against the bacteria adhering to the dielectric partition wall with high efficiency, and thus the bacteria can be killed in a short time.

In a liquid treatment apparatus according to a seventeenth aspect of the present disclosure, for example, the liquid treatment apparatus according to the fifteenth aspect may further include a gas supplying apparatus that supplies gas to the gap.

With the feature described above, an amount of gas in the water to be treated can be increased, and thus the radicals can be produced with higher efficiency.

In a liquid treatment apparatus according to an eighteenth aspect of the present disclosure, for example, the gas supplying apparatus according to the seventeenth aspect may supply the gas into the water to be treated through the gap and the opening of the insulator, generating a gas bubble in the water to be treated, the water to be treated being present in the first space of the treatment tank, and the power supply may apply the high-frequency AC voltage between the first electrode and the second electrode, thereby causing discharge in the gas bubble to generate plasma.

With the features described above, the radicals can be more efficiently produced in the water to be treated. Furthermore, when the high-frequency AC voltage is applied between the first electrode and the second electrode from the power supply, the bacteria in the water to be treated are attracted to adhere to the wall surface of the dielectric partition wall. As a result, the radicals produced by the plasma can be collided against the bacteria adhering to the dielectric partition wall with higher efficiency, and thus the bacteria can be killed in a shorter time.

In a liquid treatment apparatus according to a nineteenth aspect of the present disclosure, for example, the liquid treatment apparatus according to the fifteenth or sixteenth aspect may further include a gas purging apparatus that purges the gas remaining in the gap prior to starting the treatment of the water to be treated.

With the feature described above, the gas purging apparatus can purge the gas from the gap between the first electrode and the insulator such that the gap is filled with a liquid. As a result, the plasma can be generated in the gas vaporized from the liquid, and thus oxygen-based radicals containing a less amount of impurities can be produced.

A liquid treatment method for treating water to be treated, according to a twentieth aspect of the present disclosure, includes the steps of preparing a liquid treatment apparatus including a treatment tank, a dielectric partition wall dividing inside of the treatment tank into a first space and a second space in which an electrolytic solution is filled, a first electrode at least part of which is arranged in the first space of the treatment tank, a second electrode at least part of which is arranged in the second space of the treatment tank, and a power supply that applies a high-frequency AC voltage between the first electrode and the second electrode, injecting the water to be treated into the first space of the treatment tank, and applying the high-frequency AC voltage between the first electrode and the second electrode from the power supply.

With the features described above, the liquid treatment method of the present disclosure can produce the radicals in the water to be treated, and can cause the bacteria in the water to be treated to adhere to the wall surface of the dielectric partition wall. Therefore, the radicals can be collided against the bacteria adhering to the dielectric partition wall with high efficiency, and thus the bacteria can be killed in a short time.

Underlying Knowledge Forming Basis of the Present Disclosure

As described in the foregoing section "BACKGROUND", The specification of Japanese Patent No. 4784624 discloses the sterilizing apparatus. The sterilizing apparatus includes the high voltage electrode and the grounding electrode, both arranged in the treatment tank which is full of water to be treated. In the sterilizing apparatus, the water to be treated is instantaneously vaporized with an instantaneous boiling phenomenon by causing discharge between the high voltage electrode and the grounding electrode. The discharge generates plasma and then the plasma produces radicals in the water to be treated. Thus, the radicals are collided against bacteria in the water to be treated, thereby sterilizing the water.

In the sterilizing apparatus of the related art, however, when bacteria exist in a larger number than radicals in the water to be treated, or when radicals exist in a larger number than bacteria, for example, a difficult arises in colliding the radicals against the bacteria floating in the water to be treated. It is hence practically impossible to realize sterilization of the water to be treated at a high speed (i.e., one-pass sterilization). Stated in another way, the related-art apparatus has the problem that the radicals produced in the water to be treated cannot be efficiently collided against the bacteria drifting in the water to be treated, and that the liquid treatment cannot be finished in a short time.

In consideration of the above-mentioned problems with the related art, the inventors have accomplished the present disclosure by finding a novel liquid treatment apparatus having features that the apparatus includes a dielectric partition wall dividing the inside of the treatment tank into a first space and a second space, and that a high-frequency AC voltage is applied between the first electrode arranged in the first space, in which the water to be treated is injected, and the second electrode arranged in the second space.

With the features described above, by applying the high-frequency AC voltage between the first electrode and the second electrode, radicals can be produced in the water to be treated, while bacteria in the water to be treated can be attracted to the dielectric partition wall such that the bacteria adhere to the wall surface of the dielectric partition wall. As a result, the bacteria in the water to be treated come into a resting state, or a trapped state, on the wall surface of the dielectric partition wall, and thus a probability of collision between the radicals and the bacteria can be increased. This enables the bacteria to be killed in a short time.

Embodiments of the present disclosure will be described below with reference to the drawings. It is to be noted that, in all the drawings referred to in the following, the same or equivalent components are denoted by the same reference symbols and duplicate description of those components is omitted in some cases.

The embodiments described below represent comprehensive and particular examples of the present disclosure. Numerical values, shapes, materials, components, layout and connection forms of the components, etc. stated in the following embodiments are merely illustrative and are not intended to restrict the present disclosure. Of the components in the following embodiments, those components that are not stated in independent Claims defining most significant concepts are explained as optional components.

First Embodiment

[Overall Configuration]

One example of an overall configuration of a liquid treatment apparatus 100 according to the first embodiment of the present disclosure is described.

FIG. 1 is a schematic view illustrating one example of the overall configuration of the liquid treatment apparatus 100 according to the first embodiment of the present disclosure. As illustrated in FIG. 1, the liquid treatment apparatus 100 according to the first embodiment includes a treatment tank 101, a dielectric partition wall 102, a first electrode 103, a second electrode 104, and a power supply 105.

As illustrated in FIG. 1, the dielectric partition wall 102 divides the inside of the treatment tank 101 into a first space 106 in which water to be treated is filled, and a second space 107 in which an electrolytic solution is filled. At least a part of the first electrode 103 is arranged in the first space 106 in a state where the first electrode 103 is partly immersed in the water to be treated. At least a part of the second electrode 104 is arranged in the second space 107 in a state where the second electrode 104 is partly immersed in the electrolytic solution. The power supply 105 for applying a high-frequency AC voltage is connected between the first electrode 103 and the second electrode 104. The second electrode 104 may be grounded. The treatment tank 101 may have an inlet 108 and an outlet 109 provided at the first space side. The water to be treated may be injected in an injection direction 110 and the water having been treated may be drained to a drain direction, as denoted by arrows in FIG. 1. Thus, the liquid treatment apparatus 100 according to the first embodiment is constituted such that the dielectric partition wall 102 is disposed in the treatment tank 101, and that the high-frequency AC voltage is applied between the first electrode 103 and the second electrode 104 from the power supply 105, thereby treating the water to be treated.

[Configuration of First Electrode and Vicinity Thereof]

One example of a configuration of the first electrode 103 and the vicinity thereof in the liquid treatment apparatus according to the first embodiment of the present disclosure will be described below. The configuration of the first electrode 103 and the vicinity thereof is not limited to the one constituted only by the first electrode 103 as illustrated in FIG. 1, and it may be variously modified to produce radicals efficiently. The following is description of one example of those modifications.

Figure 2:
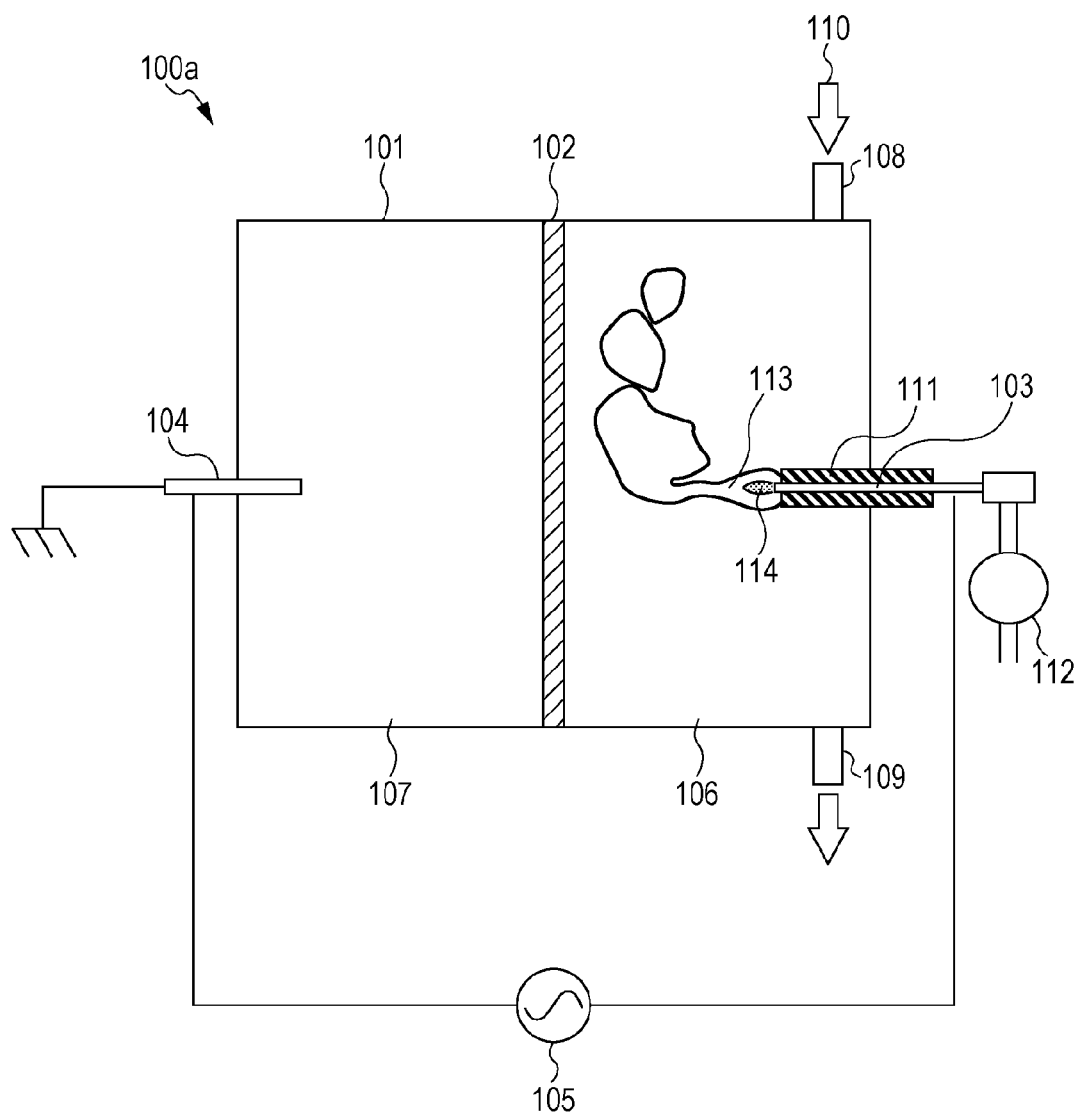
FIG. 2 is a schematic view illustrating one example of an overall configuration of a modified liquid treatment apparatus according to the first embodiment of the present disclosure.

FIG. 2 is a schematic view illustrating one example of an overall configuration of a modified liquid treatment apparatus 100a according to the first embodiment. As illustrated in FIG. 2, the liquid treatment apparatus 100a includes, in the vicinity of the first electrode 103, an insulator 111 covering the first electrode 103 and a gas supplying apparatus 112 for supplying gas into the water to be treated. The first electrode 103 has a cylindrical (e.g., circular cylindrical) shape with openings at both ends. The insulator 111 is arranged in contact with an outer peripheral surface of the first electrode 103. A metal of the first electrode 103 is exposed only at its end. Because the insulator 111 is arranged entirely over the outer peripheral surface of the first electrode 103, the outer peripheral surface of the first electrode 103 is not directly contacted with the water to be treated. Furthermore, a quantity of exposure of the first electrode 103 can be adjusted, and an end face of the first electrode 103 may be arranged inward of the insulator 111.

In the present disclosure, a region of a conductor surface of the first electrode, which is not covered with the insulator, is called an "exposed surface" in some cases. In the examples illustrated in FIGS. 2 and 3, an end of the first electrode 103 where the metal is exposed corresponds to the exposed surface. When the end face of the first electrode is arranged inward of the insulator, i.e., when the end face of the first electrode is located at a position recessed from the end face of the insulator, the end face of the first electrode corresponds to the exposed surface.

The gas supplying apparatus 112 is connected to one end of the first electrode 103. The gas supplying apparatus 112 supplies the gas to the first space 106 in the treatment tank 101 through the inside of the cylindrical first electrode 103, thereby forming a gas bubble 113 in the water to be treated. The gas in the gas bubble 113 covers an opening of the first electrode 103. In other words, the opening of the first electrode 103 is positioned in the gas bubble 113. The gas bubble 113 has a columnar shape, for example. In the liquid treatment apparatus 100a, therefore, the opening of the first electrode 103 functions also as a gas bubble generating portion. As illustrated in FIG. 2, the end of the first electrode 103 is not covered with the insulator 111 such that the first electrode 103 is partly exposed. By properly setting an amount of the gas supplied from the gas supplying apparatus 112, the liquid treatment apparatus 100a can maintain a state where the end of the first electrode 103 is covered with the gas inside the gas bubble 113. Moreover, the insulator 111 is arranged over the outer peripheral surface of the first electrode 103. Accordingly, the surface of the first electrode 103 can be kept in a state not directly contacting with the water to be treated. Stated in another way, when the gas is continuously supplied in an appropriate amount, the surface of the first electrode 103 can be kept in the state not directly contacting with the water to be treated, i.e., a state where the first electrode 103 is not exposed to the water to be treated. Strictly speaking, an inner peripheral surface of the first electrode 103 also corresponds to the exposed surface that is not covered with the insulator. However, the inner peripheral surface of the first electrode 103 can be isolated from the water to be treated by covering the end of the first electrode 103 with the gas bubble. This implies that the gas bubble 113 may not cover the entire inner peripheral surface of the first electrode 103. However, insofar as the end of the first electrode 103 is covered with the gas bubble, a part of the inner peripheral surface of the first electrode 103 may be directly contacted with the liquid.

In the present disclosure, the expression "the surface of the first electrode is not directly contacted with the liquid" implies that the surface of the first electrode is not directly contacted with a large mass of liquid in the treatment tank. Accordingly, for example, a state where the surface of the first electrode 103 is wetted with the liquid (strictly speaking in another way, the surface of the first electrode is contacted with the liquid), and where the gas bubble covers the wetted surface is also involved in the state where "the surface of the first electrode is not directly contacted with the liquid". Such a state may occur, for example, in the case that the gas bubble is generated from the gas bubble generating portion in the condition where the surface of the first electrode is wetted with the liquid.

While the first embodiment represents examples of the configuration of the first electrode 103 and the vicinity thereof, the present disclosure is not limited to the configurations of the first embodiment. Thus, the configuration of the first electrode 103 and the vicinity thereof may be practiced in various ways. In addition to the configurations illustrated in FIGS. 1 and 2, there are, e.g., a configuration in which the insulator is arranged with a space between the outer peripheral surface of the first electrode, a configuration in which a gas supplying apparatus for supplying gas to the first electrode is disposed, and a configuration in which a plurality of first electrodes are disposed. Other examples of the configuration of the first electrode and the vicinity thereof will be described later in second to fourth embodiments.

One example of various components of the liquid treatment apparatus 100a according to the first embodiment will be described in detail below.

<Treatment Tank>

The treatment tank 101 is divided by a dielectric partition wall 102 into the first space 106 and the second space 107. The first space 106 is filled with the water to be treated. The treatment tank 101 has, at the first space side, an inlet 108 through which the water to be treated is injected and an outlet 109 through which the water having been treated is drained. The inlet 108 may be arranged in an upper surface of the treatment tank 101 at the first space side. The outlet 109 may be arranged in a lower surface of the treatment tank 101 at the first space side. In the example illustrated in FIG. 2, the inlet 108 is positioned in the upper surface of the treatment tank 101, and the outlet 109 is positioned in the lower surface of the treatment tank 101 and on an extension line extending from the inlet 108 in an injection direction 110 in which the water to be treated is injected. In other words, the inlet 108 and the outlet 109 are arranged to linearly align with each other in the injection direction 110 in which the water to be treated flows. With such an arrangement, the distance from the inlet 108 to the outlet 109, i.e., the length of a water channel, may be shortest. However, respective positions of the inlet 108 and the outlet 109 are not limited to the above-described ones.

Figure 3:
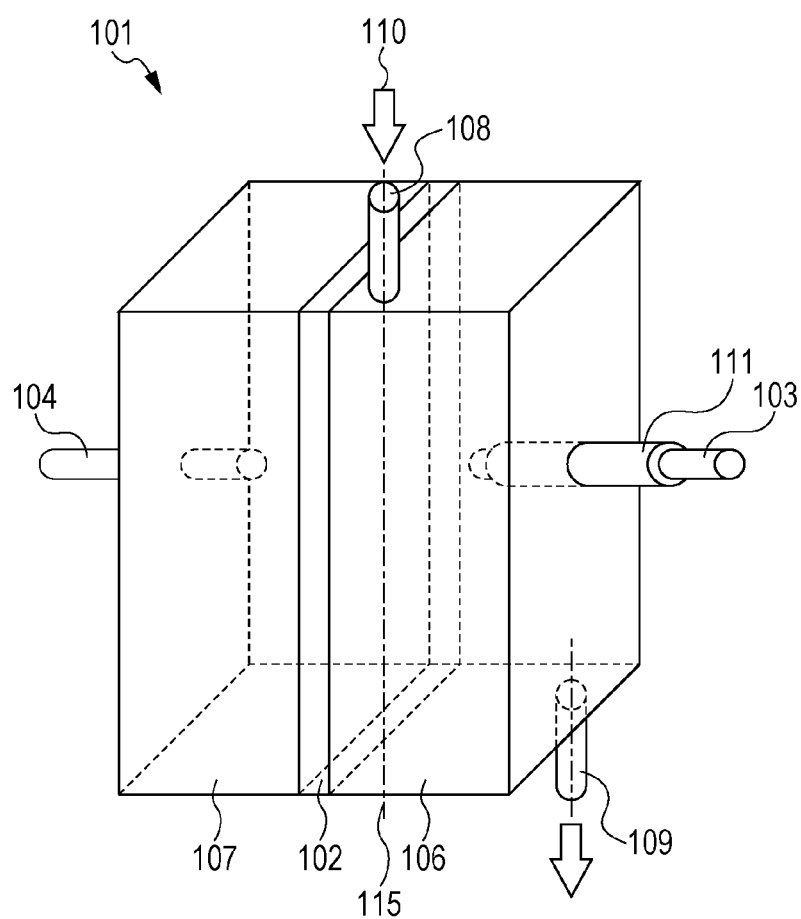
FIG. 3 is a schematic view illustrating one example of layout of an inlet and an outlet of a treatment tank in the first embodiment of the present disclosure.

FIG. 3 illustrates one example of the inlet 108 and the outlet 109 arranged in the treatment tank 101. As illustrated in FIG. 3, the outlet 109 may be positioned in a surface of the treatment tank 101, the surface opposing to another surface thereof where the inlet 108 is arranged, and not on an extension line 115 extending from the inlet 108 in the injection direction 110 in which the water to be treated is injected. Stated in another way, the inlet 108 and the outlet 109 may be arranged not to linearly align with each other in the injection direction 110 of the water to be treated. With such an arrangement, the distance from the inlet 108 to the outlet 109, i.e., the length of the water channel, is increased. Thus, it is possible to increase a probability that bacteria in the water to be treated adhere to the dielectric partition wall 102 during a period until the water to be treated reaches the outlet 109 from the inlet 108. Hence the bacteria in the water to be treated are trapped more easily. As a result, radicals generated in the water to be treated can be collided against the bacteria adhering to the dielectric partition wall 102 with higher efficiency, and thus the bacteria in the water to be treated can be killed in a shorter time.

The second space 107 is filled with an electrolytic solution. The electrolytic solution filled in the second space 107 may be, e.g., water, tap water, acetic acid, ammonia water, or a liquid prepared by adding sodium sulfate to water and adjusting conductivity of the mixture. The treatment tank 101 may include a gas bleeding hole or a check valve at the second space side. Dimensions of the treatment tank 101 are not limited to particular values. The treatment tank 101 can be used, for example, in a water purifying apparatus, an air conditioner, a humidifier, a washing machine, an electric shaver washer, or a dish washer.

Because of the second space 107 being filled with the electrolytic solution, when the high-frequency AC voltage is applied between the first electrode 103 and the second electrode 104 from the power supply 105, an AC component can be reliably conducted between the first electrode 103 and the second electrode 104 through the electrolytic solution. If the second space 107 is not filled with the electrolytic solution and the second electrode 104 is directly contacted with the dielectric partition wall 102, a dielectric barrier discharge may occur in the contact part, though depending on combination of respective materials of the electrode and a dielectric member. Dielectric barrier discharge causes generation of ozone. Thus, the electrolytic solution filled in the second space 107 can prevent the dielectric barrier discharge to suppress the generation of ozone.

<Dielectric Partition Wall>

The dielectric partition wall 102 is arranged to divide the inside of the treatment tank 101 into the first space 106 and the second space 107. When the high-frequency AC voltage is applied between the first electrode 103 and the second electrode 104, the dielectric partition wall 102 is charged to be positive and negative alternately. Therefore, the dielectric partition wall 102 functions as a capacitor. More specifically, in the dielectric partition wall 102, when a wall surface at the second space side is charged to be negative, a wall surface at the first space side is charged to be positive and thereby a positive electric field is formed in the first space 106. The positive electric field attracts bacteria, which are present in the water to be treated and are charged to be negative, thereby causing the bacteria to adhere to the wall surface of the dielectric partition wall 102.

The dielectric partition wall 102 is arranged such that, when the high-frequency AC voltage is applied between the first electrode 103 and the second electrode 104, a DC component is not conducted between the first electrode 103 and the second electrode 104. More specifically, as illustrated in FIG. 3, the dielectric partition wall 102 cuts off inflow and outflow of the liquid between the first space 106 and the second space 107 such that the liquid is not transferred between the first space 106 and the second space 107.

Figure 4:
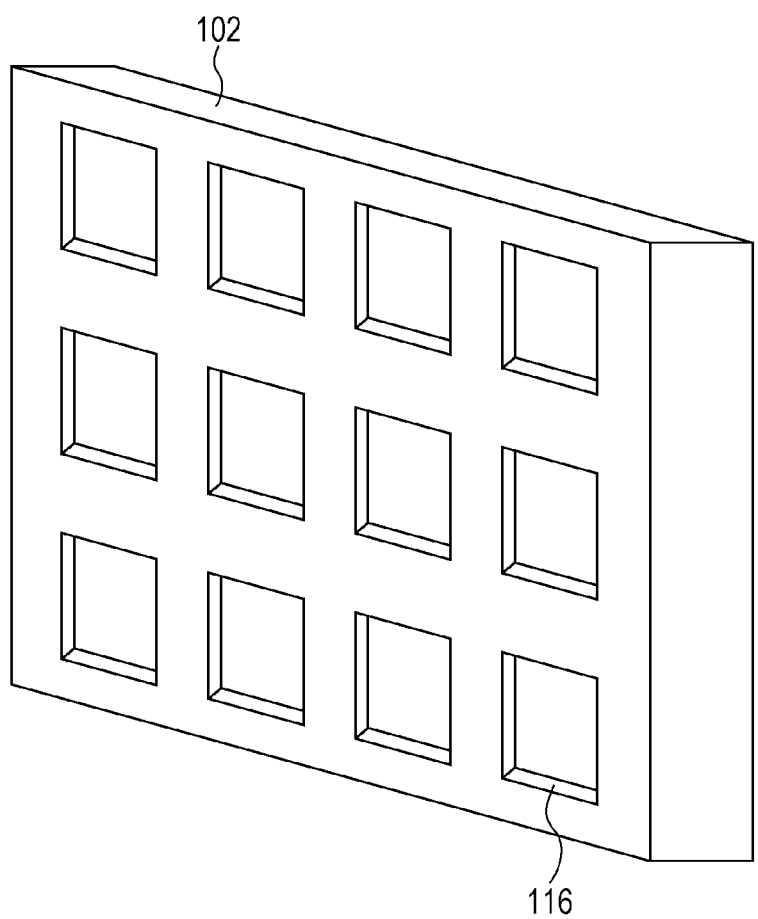
FIG. 4 is a schematic view illustrating one example of a structure of a dielectric partition wall in the first embodiment of the present disclosure.

FIG. 4 is a schematic view illustrating one example of a structure of the dielectric partition wall 102 in the first embodiment. As illustrated in FIG. 4, the dielectric partition wall 102 has a concave-convex structure including a plurality of concave-convex portions 116 formed in a wall surface thereof. Assuming the square concave-convex portion 116 to be one cell, the concave-convex structure may be, for example, a structure in which 3×4 cells are arrayed, or a structure in which 8×8 cells are arrayed. FIG. 4 illustrates the dielectric partition wall 102 having the concave-convex structure in which the square concave-convex portions 116 are arrayed in a pattern of 3×4 cells. However, the concave-convex structure is not limited to the illustrated one. Since the dielectric partition wall 102 has the plural concave-convex portions 116 in the wall surface thereof, the electric field strength in the concave-convex portions 116 can be increased in accordance with the so-called edge effect. In more detail, because the concave-convex portions 116 can increase the electric field strength in comparison with a region other than the concave-convex portions 116, a difference in the electric field strength can be generated in the wall surface of the dielectric partition wall 102. Thus, since the wall surface of the dielectric partition wall 102 has the concave-convex structure, the bacteria in the water to be treated can be attracted to adhere to the wall surface of the dielectric partition wall 102 even when the water to be treated in the first space 106 is in a turbulent state. The concave-convex structure may be formed in the wall surface of the dielectric partition wall 102 on either the first space side or the second space side.

In the present disclosure, the term "concave-convex portion" implies a step part formed in the wall surface of the dielectric partition wall, and the vicinity thereof. More specifically, in the example illustrated in FIG. 4, the concave-convex portion 116 corresponds to a square step part, which is provided by forming a square recess. The concave-convex portion 116 in the wall surface of the dielectric partition wall 102 may be, for example, a step part, which is provided by forming a recess in the dielectric partition wall 102, or which is provided by forming a projection on the dielectric partition wall 102. Other suitable manners may also be optionally used to form the concave-convex portion 116. The concave-convex portion 116 can be formed, for example, by carrying out surface processing on a plate-like dielectric member.

The dielectric partition wall 102 has a thickness of less than 10 mm, for example. The concave-convex portion 116 has a depth or a height in the range of, e.g., 0.1 mm or more to 3 mm or less from the wall surface. A distance between adjacent two of the plural concave-convex portions 116 is in the range of, e.g., 1 mm or more to 30 mm or less. Dimensions of the dielectric partition wall 102 are not limited to the above-mentioned values. There are no particular limitations insofar as adhering of bacteria is ensured even when the dimensions are set to other values than mentioned above.

The dielectric partition wall 102 may be made of acrylic resin, polycarbonate, polyvinylidene fluoride, or barium titanate, for example.

A material of the dielectric partition wall 102 is selected from those materials capable of blocking off liquid exchange between the first space 106 and the second space 107. The dielectric partition wall 102 made of such a material prevents the water to be treated in the first space 106 from leaking to the second space 107 and prevents the electrolytic solution in the second space 107 from leaking to the first space 106. Thus, the material of the dielectric partition wall 102 is required to be so dense as not to allow permeation of a liquid therethrough. To that end, the dielectric partition wall 102 may have no holes of, e.g., 0.1 mm or more, which penetrate through the wall in the direction of thickness thereof to allow communication between the first space 106 and the second space 107.

<First Electrode>

At least a part of the first electrode 103 is arranged in the first space 106 within the treatment tank 101, the first space 106 being filled with the water to be treated. A position of the first electrode 103 is not limited to particular one insofar as the first electrode 103 is arranged in the first space 106. The first electrode 103 is made of, e.g., iron, tungsten, copper, aluminum, platinum, or an alloy containing one or plural selected from among those metals. To prolong the electrode lifetime, yttrium oxide added with an electric conductor may be coated on a part of the surface of the first electrode 103 by thermal spraying. The yttrium oxide added with the electric conductor has electric resistivity of 1 to 30 Ωcm, for example. While, in the example illustrated in FIG. 2, the first electrode 103 has a cylindrical (e.g., circular cylindrical) shape with openings at both ends, the shape of the first electrode 103 is not limited to the illustrated one.

<Second Electrode>

At least a part of the second electrode 104 is arranged in the second space 107 within the treatment tank 101, the second space 107 being filled with the electrolytic solution. A position of the second electrode 104 is not limited to particular one insofar as the second electrode 104 is arranged in the second space 107. The second electrode 104 is just required to be made of a conductive metal material. Similarly to the first electrode 103, the second electrode 104 is made of, e.g., iron, tungsten, copper, aluminum, platinum, or an alloy containing one or plural selected from among those metals. The second electrode 104 may be grounded.

<Power Supply>

The power supply 105 is disposed to connect the first electrode 103 and the second electrode 104. The power supply 105 applies a high-frequency AC voltage between the first electrode 103 and the second electrode 104. A frequency of the AC voltage may be 1 kHz or higher, for example. The power supply 105 may apply the so-called bipolar pulse voltage such that a positive pulse voltage and a negative pulse voltage are applied alternately. This enables the electrode lifetime to be prolonged.

<Insulator>

The insulator 111 is arranged around the first electrode 103. The size and the shape of the insulator 111 are not limited to particular ones, and they can be changed depending on the configuration of the first electrode 103 and the vicinity thereof. In the example illustrated in FIG. 2, the insulator 111 may be formed directly over the outer periphery of the cylindrical first electrode 103 by, e.g., plasma spraying. The insulator 111 has a thickness of 0.1 mm, for example. The insulator 111 may be made of, e.g., aluminum oxide, magnesium oxide, yttrium oxide, insulating plastic, glass, or quartz.

<Gas Supplying Apparatus>

The gas supplying apparatus 112 is connected to one end of the first electrode 103. The gas supplying apparatus 112 supplies gas to the first space 106 filled with the water to be treated, causing the gas bubble 113 to be formed in the water to be treated. The gas supplying apparatus 112 may be a pump, for example. The supplied gas is, e.g., air, He, Ar, or $O_2$. While a flow rate of the gas is not limited to a particular value, it may be set to the range of, e.g., 0.5 liter/min to 2.0 liter/min.

[Operation (Liquid Treatment Method)]

One example of the liquid treatment method according to the first embodiment, i.e., one example of the operation of the liquid treatment apparatus 100a according to the first embodiment, will be described below.

Prior to starting the liquid treatment, the electrolytic solution is filled into the second space 107 within the treatment tank 101. The electrolytic solution may be injected, for example, through the gas bleeding hole that is formed in the treatment tank 101 at the second space side.

Prior to starting the liquid treatment, the water to be treated is filled into the first space 106 within the treatment tank 101. The water to be treated is injected, for example, through the inlet 108. During the liquid treatment, the water to be treated may be continuously injected through the inlet 108 and drained through the outlet 109.

The gas supplying apparatus 112 supplies the gas into the water to be treated through the opening of the first electrode 103. In the water to be treated, the gas bubble 113 is formed in a columnar shape, for example. As described above, the opening of the first electrode 103 is covered with the gas inside the gas bubble 113. The gas bubble 113 is a single large-sized gas bubble that is formed over a certain distance from the opening of the first electrode 103 without interruption, for example. Thus, the supply of the gas from the gas supplying apparatus 112 can provide a state where the end of the first electrode 103 is positioned inside the gas bubble 113. In other words, when the gas supplying apparatus 112 supplies the gas, a region where the conductor of the first electrode 103 is exposed can be covered with the gas inside the gas bubble 113. Since the gas inside the gas bubble 113 covers the end of the first electrode 103, the gas-liquid interface is not "closed" in the water to be treated. The gas bubble 113 is contacted with the insulator 111 in the vicinity of the end of the first electrode 103. As described above, the conductor portion of the first electrode 103 is exposed only at the end thereof, and the end of the first electrode 103 is covered with the gas bubble 113 when the gas bubble 113 is generated. Accordingly, the outer surface of the first electrode 103 is isolated from the water to be treated by both the gas bubble 113 and the insulator 111. When the gas is supplied, the inner peripheral surface of the first electrode 103 is covered with the supplied gas and is not directly contacted with the water to be treated.

After the portion of the first electrode 103 where the conductor of the first electrode 103 is exposed is covered with the gas bubble 113, the high-frequency AC voltage is applied between the first electrode 103 and the second electrode 104 from the power supply 105. By applying the high-frequency AC voltage between the first electrode 103 and the second electrode 104, discharge is caused and thus plasma 114 is generated in the vicinity of the first electrode 103 and inside the gas bubble 113. While the plasma 114 spreads over the entirety of the gas bubble 113, the high density plasma 114 is generated particularly in the vicinity of the first electrode 103. The plasma 114 produces radicals, etc. that sterilize the water to be treated and/or decompose chemical substances contained in the water to be treated. When the first electrode 103 has a cylindrical shape, the plasma 114 may be generated in an inner peripheral portion of the first electrode 103 as well. The distance between the first electrode 103 and the second electrode 104 is not limited to a particular value.

Furthermore, when the high-frequency AC voltage is applied between the first electrode 103 and the second electrode 104, the dielectric partition wall 102 arranged in the treatment tank 101 is charged to be positive and negative alternately. Thus, the dielectric partition wall 102 functions as a capacitor. More specifically, when the wall surface of the dielectric partition wall 102 at the second space side is charged to be negative, the wall surface of the dielectric partition wall 102 at the first space side is charged to be positive, and thereby a positive electric field is formed in the first space 106. Bacteria in the water to be treated within the first space 106 are charged to be negative in many cases. Therefore, the bacteria are attracted to the dielectric partition wall 102 by the positive electric field formed in the first space 106, so as to adhere to the wall surface of the dielectric partition wall 102.

As a result, in the liquid treatment apparatus 100a according to the first embodiment, the radicals, which have been produced by the plasma 114, can collide against the bacteria adhering to the wall surface of the dielectric partition wall 102.

[Sterilization Effect]

One example of the sterilization effect of the liquid treatment apparatus 100a according to the first embodiment will be described below. The results obtained by conducting experiments on two types of apparatuses, i.e., a liquid treatment apparatus, as COMPARATIVE EXAMPLE, not including the dielectric partition wall 102, and the liquid treatment apparatus 100a according to the first embodiment are compared in the following.

COMPARATIVE EXAMPLE is first described.

Comparative Example

The liquid treatment apparatus of COMPARATIVE EXAMPLE is constituted as follows. The liquid treatment apparatus of COMPARATIVE EXAMPLE is different from the liquid treatment apparatus 100a according to the first embodiment in a point of not including the dielectric partition wall in the treatment tank. Thus, in COMPARATIVE EXAMPLE, the first electrode and the second electrode are both partly immersed in the water to be treated. The other configuration is the same as that in the liquid treatment apparatus 100a according to the first embodiment. Experiment conditions in COMPARATIVE EXAMPLE were set such that a high frequency of a power supply was 30 kHz with half-wave rectification, input power of the primary side was 30 W, and a current was 0.43 A. The treatment tank was filled with water, a flow rate of the water was 1.17 mL/min, and electric conductivity of the water was 17.3 mS/m.

Next, EXAMPLES 1 and 2 are described.

Example 1

In EXAMPLE 1, the liquid treatment apparatus 100a according to the first embodiment, illustrated in FIG. 2, has the concave-convex structure in the wall surface of the dielectric partition wall 102. The concave-convex structure includes 3×4 cells each formed by one concave-convex portion. Experiment conditions in EXAMPLE 1 were set such that a high frequency of the power supply 105 was 30 kHz without half-wave rectification, input power of the primary side was 30 W, and a current was 0.43 A. A volume of the cells of the dielectric partition wall 102 was 300 cc. The first space 106 of the treatment tank 101 was filled with water, a flow rate of the water was 1.17 mL/min, and electric conductivity of the water was 17.3 mS/m.

Example 2

EXAMPLE 2 is different from EXAMPLE 1 in that the second electrode 104 is grounded. The other configuration and conditions are the same as those in EXAMPLE 1.

Figure 5:
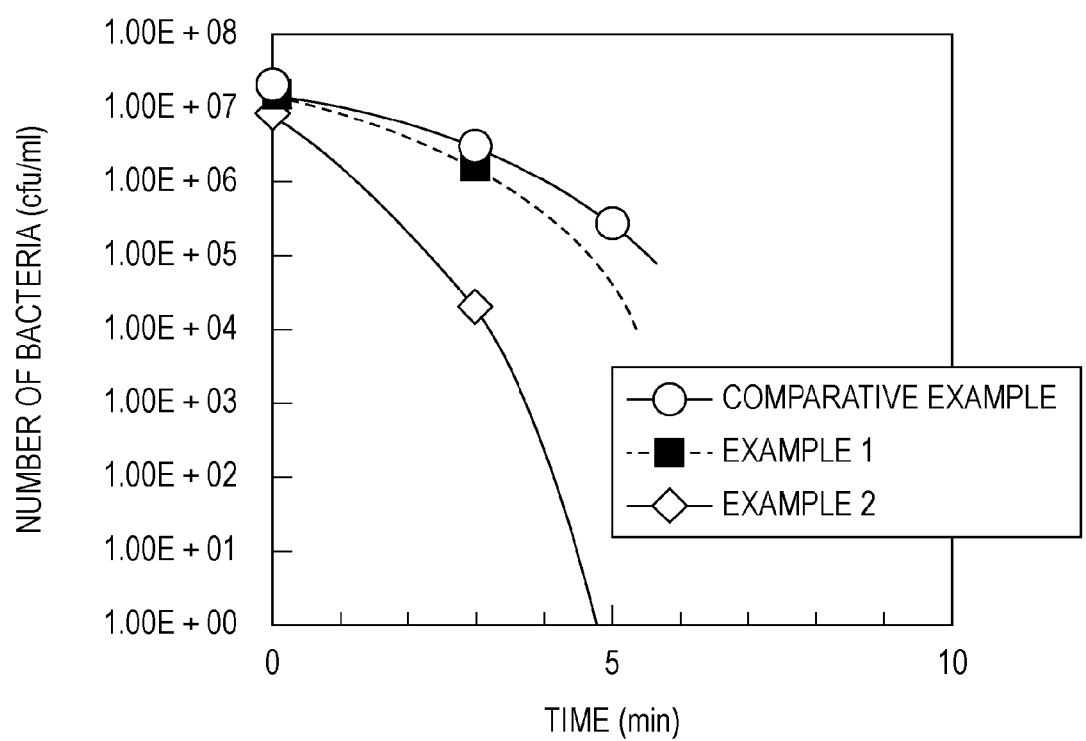
FIG. 5 is a graph depicting changes in the number of bacteria in EXAMPLES of the liquid treatment apparatus according to the first embodiment of the present disclosure and in COMPARATIVE EXAMPLE.

Experiments of sterilizing the water to be treated were carried out using the above-described liquid treatment apparatuses of COMPARATIVE EXAMPLE, EXAMPLE 1, and EXAMPLE 2. FIG. 5 depicts the experiment results of the liquid treatment apparatus of COMPARATIVE EXAMPLE, and two types of the liquid treatment apparatus 100a according to the first embodiment, i.e., EXAMPLES 1 and 2. The vertical axis of FIG. 5 denotes the number of bacteria, and the horizontal axis denotes time. In FIG. 5, white circles represent COMPARATIVE EXAMPLE, black squares represent EXAMPLE 1, and white rhombuses represent EXAMPLE 2.

As seen from FIG. 5, looking at the number of bacteria after 5 minutes from the start of the experiments, the number of bacteria was reduced in EXAMPLES 1 and 2 to a larger extent than in COMPARATIVE EXAMPLE that does not include the dielectric partition wall. In EXAMPLE 2 in which the second electrode 104 was grounded, the number of bacteria was significantly reduced and the sterilization was completed after 5 minutes.

Thus, in the liquid treatment apparatus 100a according to the first embodiment in which the dielectric partition wall 102 is arranged in the treatment tank 101, the bacteria in the water to be treated can be killed in a short time by applying the high-frequency AC voltage. By grounding the second electrode 104, the bacteria in the water to be treated can be killed at a higher speed, i.e., in a shorter time.

The reason why the bacteria in the water to be treated can be killed at a higher speed in EXAMPLE 2 than in EXAMPLE 1 is described below. By grounding the second electrode 104, a self-bias voltage is applied, and thus charging in the dielectric partition wall 102 is apt to occur more easily as per intended. Here, "charging in the dielectric partition wall 102 occurs as per intended" implies that, when the wall surface of the dielectric partition wall 102 at the second space side is charged to be negative, the wall surface of the dielectric partition wall 102 at the first space side is charged to be positive, and that the positive electric field is generated in the first space 106. It is deemed that, in EXAMPLE 2, as a result of grounding the second electrode 104, the charging occurs at a level stronger than in EXAMPLE 1 and thus a larger number of bacteria are attracted to more easily adhere to the wall surface of the dielectric partition wall 102. Thus, the magnitude of a force acting on the bacteria against a flow field is changed depending on the charged state of the surface of the dielectric partition wall 102, and with an increase of the above-mentioned force, the bacteria are attracted to more easily adhere to the dielectric partition wall 102.

As described above, the liquid treatment apparatus 100a according to the first embodiment can produce the radicals by the plasma 114 with high efficiency, and can make the bacteria adhere to the wall surface of the dielectric partition wall 102. As a result, the radicals can be collided against the bacteria in the water to be treated with high efficiency, and thus the water to be treated can be treated in a short time.

It is typically said that bacteria are decomposed at the interface where plasma and a liquid are contacted with each other. According to studies conducted by the inventors, however, it may be considered that the number of bacteria killed at the interface between plasma and a liquid is small, and that the bacteria are killed by the radicals colliding against the bacteria floating in water. The liquid treatment apparatus 100a according to the first embodiment can produce radicals having long lifetimes and then can make the radials having long lifetimes collide against the bacteria in the water to be treated. Moreover, since the radicals act on the bacteria adhering to the dielectric partition wall in a resting state, the radicals can be effectively collided against the bacteria to kill the bacteria.

In addition, typically, probability of the collision between the radicals and the bacteria is proportional to the product of the number density of bacteria and the number density of radicals. Therefore, as the number of bacteria reduces, the sterilization speed slows even when the radicals having longer lifetimes are used. In the liquid treatment apparatus 100a according to the first embodiment, however, the radicals can be efficiently collided against the bacteria, and thus the sterilization speed can be increased. Accordingly, a significant effect can be obtained even when the liquid treatment apparatus 100a is applied to a one-pass sterilization system in which the water to be treated is sterilized while passing through plasma generation region only once. The liquid treatment apparatus 100a can be also effective when applied to the case of treating the water to be treated in a circulated state.

Second Embodiment

A liquid treatment apparatus 200 according to a second embodiment will be described below.

Figure 6:
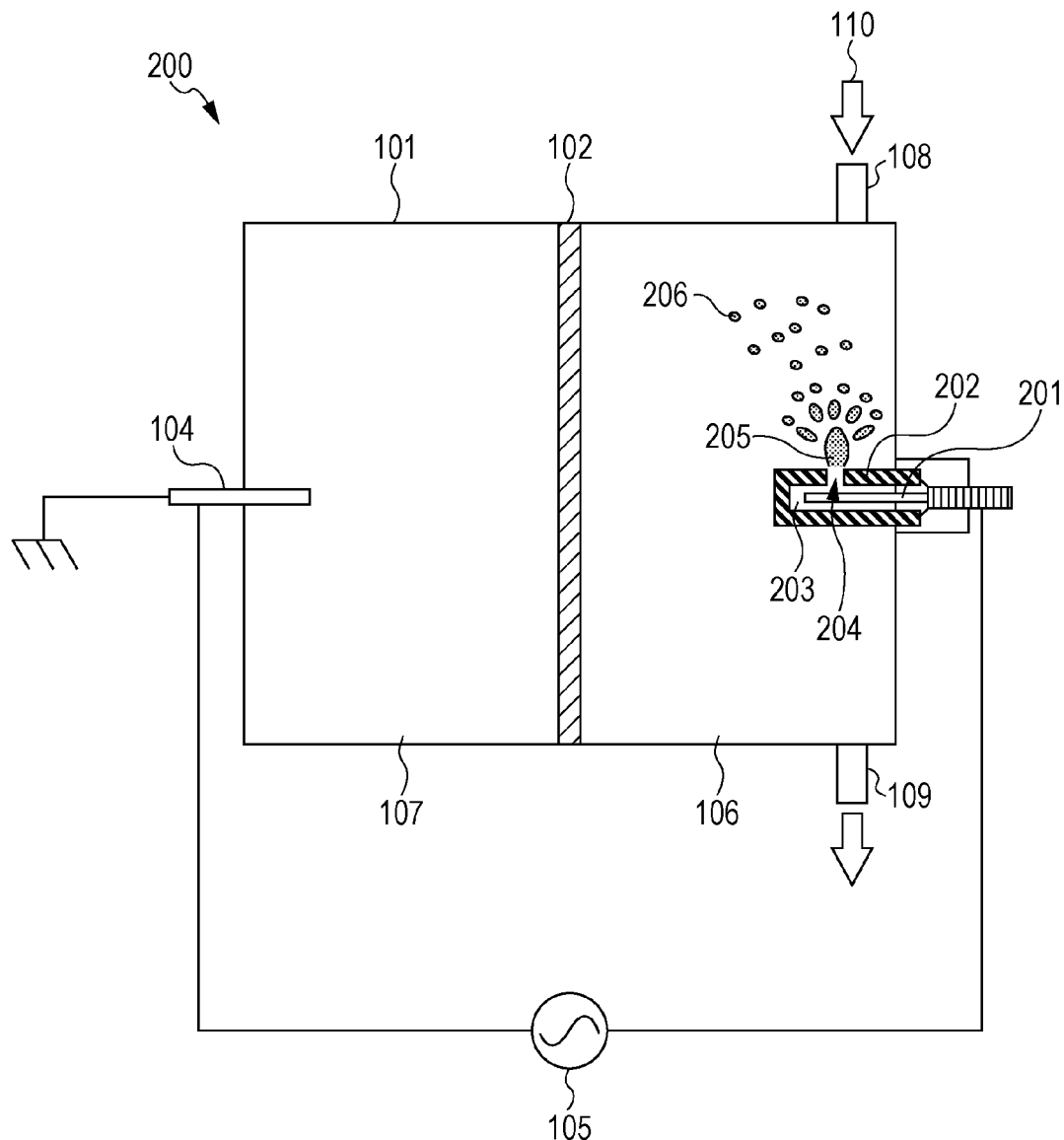
FIG. 6 is a schematic view illustrating one example of an overall configuration of a liquid treatment apparatus according to a second embodiment of the present disclosure.

FIG. 6 is a schematic view illustrating one example of an overall configuration of the liquid treatment apparatus 200 according to the second embodiment. As illustrated in FIG. 6, the configuration of a first electrode 201 and the vicinity thereof in the second embodiment is different from that in the first embodiment in shape of the first electrode 201 and layout of an insulator 202. The configuration of the first electrode 201 and the vicinity thereof in the second embodiment is further different from that in the first embodiment in a point of not including the gas supplying apparatus. The other configuration of the second embodiment is the same as that in the first embodiment. The configuration of the first electrode 201 and the vicinity thereof in the second embodiment will be described below.

[Second Configuration of First Electrode and Vicinity Thereof]

As illustrated in FIG. 6, the configuration of the first electrode 201 and the vicinity thereof includes the first electrode 201 and the insulator 202. The first electrode 201 has a circular columnar shape, for example. The insulator 202 is arranged around the first electrode 201 with a gap 203 between the insulator 202 and an outer periphery of the first electrode 201. An opening 204 is formed in the insulator 202. Prior to starting the liquid treatment, the gap 203 between the first electrode 201 and the insulator 202 is filled with the water to be treated. When the power supply 105 applies the high-frequency AC voltage between the first electrode 201 and the second electrode 104 in the above-mentioned state, a current flows through the water to be treated in the gap 203 from the first electrode 201. The current heats to vaporize the water to be treated in the gap 203, generating gas. When the gas passes through the opening 204 of the insulator 202, discharge occurs, whereby plasma 205 is generated. Stated in another way, in the second embodiment, the plasma 205 is generated by causing discharge in the gas vaporized from the water to be treated. As a result, purer radicals containing a smaller amount of impurities, e.g., nitrogen ions, can be produced in comparison with the first embodiment.

[Operation (Liquid Treatment Method)]

One example of the liquid treatment method according to the second embodiment, i.e., one example of the operation of the liquid treatment apparatus 200 according to the second embodiment, will be described below.

Prior to starting the liquid treatment, the electrolytic solution is filled into the second space 107 within the treatment tank 101. Furthermore, prior to starting the liquid treatment, the gap 203 between the first electrode 201 and the insulator 202 is filled with the water to be treated.

The power supply 105 applies the high-frequency AC voltage between the first electrode 201 and the second electrode 104. The water to be treated in the gap 203 is heated by power applied from the first electrode 201, and thereby gas vaporized from the water is produced. The gas is aggregated into a mass in the gap 203. Due to a pressure difference between pressure in the gap 203 and pressure in the treatment tank 101, the gaseous mass is let out from the opening 204 of the insulator 202 into the water to be treated, which is present in the first space 106 of the treatment tank 101.

When the gaseous mass passes through the opening 204 of the insulator 202, the water to be treated in the opening 204 is replaced with the gas, and the gas surrounded by the water to be treated, i.e., a gas bubble, is formed. Thus, the gas bubble insulates a conducting path from the first electrode 201 to the water to be treated. At that time, the high-frequency AC voltage from the power supply 105 is applied to the gas bubble in the opening 204, and thereby discharge occurs due to concentration of an electric field. As a result, the plasma 205 is generated inside the gas bubble. Once the plasma 205 is generated, the plasma 205 is successively and continuously generated. The gas bubble containing the plasma 205 is let out from the opening 204 of the insulator 202 into the water to be treated. The gas bubble containing the plasma 205 comes into a state protruding from the opening 204 of the insulator 202 into the water to be treated, which is present in the first space 106 of the treatment tank 101.

Small parts of the protruding gas bubble are separated from a main part, whereby a plurality of gas bubbles 206 is formed. The plural gas bubbles 206 are diffused into the water to be treated, which is present in the first space 106 of the treatment tank 101. The plural gas bubbles 206 include bubbles having diameters of micrometer or less. In other words, the liquid treatment apparatus 200 according to the second embodiment has the function of generating microbubbles. Unlike typical microbubbles, the gas bubbles 206 contain electrons, ions, or radicals produced by the plasma 205. With the aid of the gas bubbles 206, the liquid treatment apparatus 200 according to the second embodiment can sterilize the water to be treated and/or decompose chemical substances contained in the water to be treated.

As in the first embodiment, when the high-frequency AC voltage is applied between the first electrode 201 and the second electrode 104, the dielectric partition wall 102 disposed in the treatment tank 101 is charged to be positive and negative alternatively. More specifically, when the wall surface of the dielectric partition wall 102 at the second space side is charged to be negative, the wall surface at the first space side is charged to be positive and thereby a positive electric field is formed in the first space 106. Since bacteria in the water to be treated is negatively charged, they are attracted by the positive electric field to adhere to the wall surface of the dielectric partition wall 102. The liquid treatment apparatus 200 carries out the sterilization by causing the radicals, which have been produced by the plasma 205, to collide against the bacteria adhering to the wall surface of the dielectric partition wall 102.

Advantageous Effects

In the liquid treatment apparatus 200 according to the second embodiment, the water to be treated is vaporized with the above-described configuration of the first electrode 201 and the vicinity thereof. Furthermore, with the liquid treatment apparatus 200 according to the second embodiment, when the gas passes through the opening 204 of the insulator 202, discharge occurs, whereby the plasma 205 is generated. Therefore, purer radicals can be produced. As a result, the water to be treated can be treated in a short time. Moreover, when the power supply 105 applies the high-frequency AC voltage between the first electrode 201 and the second electrode 104, the wall surface of the dielectric partition wall 102 at the first space side is charged to be positive, thus causing the bacteria, which are present in the water to be treated, to adhere to the wall surface of the dielectric partition wall 102. Hence the liquid treatment apparatus 200 can make the radicals, which have been produced by the plasma 205, collide against the bacteria adhering to the wall surface of the dielectric partition wall 102 with high efficiency, and thus can treat the water to be treated in a short time.

Third Embodiment

A liquid treatment apparatus 300 according to a third embodiment will be described below.

Figure 7:
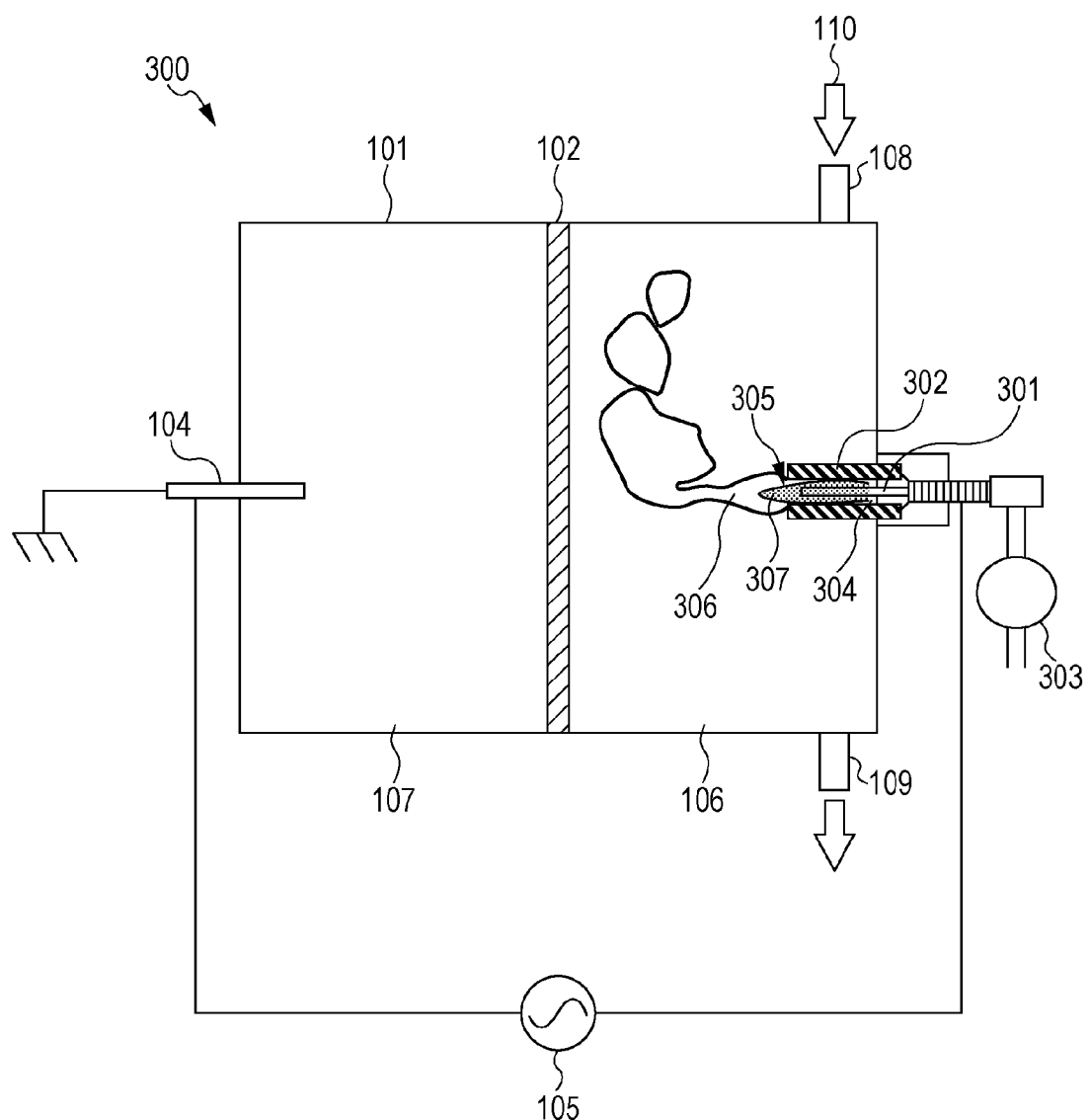
FIG. 7 is a schematic view illustrating one example of an overall configuration of a liquid treatment apparatus according to a third embodiment of the present disclosure.

FIG. 7 is a schematic view illustrating one example of an overall configuration of the liquid treatment apparatus 300 according to the third embodiment. As illustrated in FIG. 7, the configuration of a first electrode 301 and the vicinity thereof in the third embodiment is different from that in the second embodiment in a point of including a gas supplying apparatus. The other configuration of the third embodiment is the same as that in the second embodiment. The configuration of the first electrode 301 and the vicinity thereof in the third embodiment will be described below.

[Third Configuration of First Electrode and Vicinity Thereof]

As illustrated in FIG. 7, the configuration of the first electrode 301 and the vicinity thereof includes the first electrode 301, an insulator 302, and a gas supplying apparatus 303. The first electrode 301 has a circular columnar shape, for example, and the insulator 302 is arranged around the first electrode 301 with a gap 304 between the insulator 302 and an outer periphery of the first electrode 301. An opening 305 is formed in the insulator 302. In FIG. 7, the opening 305 is formed in a lateral surface of the insulator 302 (at the left side in the drawing), but is not limited to the illustrated one. The gas supplying apparatus 303 for supplying gas is connected to one end of the first electrode 301. The gas supplying apparatus 303 supplies the gas to the gap 304 between the first electrode 301 and the insulator 302. The gas covers the surroundings of the first electrode 301, and is let out from the opening 305 of the insulator 302 into the water to be treated, thus forming a gas bubble 306. Accordingly, when the power supply 105 applies the high-frequency AC voltage between the first electrode 301 and the second electrode 104 in such a state, discharge occurs stably in the gas bubble 306, whereby plasma 307 is efficiently generated. Stated in another way, in the third embodiment, OH radicals having long lifetimes can be produced by generating the plasma 205 with high efficiency.

[Operation (Liquid Treatment Method)]

One example of the liquid treatment method according to the third embodiment, i.e., one example of the operation of the liquid treatment apparatus 300 according to the third embodiment, will be described below.

Prior to starting the liquid treatment, the electrolytic solution is filled into the second space 107 within the treatment tank 101.

Furthermore, prior to starting the liquid treatment, the water to be treated is filled into the first space 106 within the treatment tank 101.

The gas supplying apparatus 303 supplies the gas to the gap 304 between the first electrode 301 and the insulator 302. A flow rate of the supplied gas may be set to 0.5 liter/min to 2.0 liter/min, for example, though not being limited to a particular value. The gas supplied to the gap 304 is let out from the opening 305 of the insulator 302 into the water to be treated, thus forming the gas bubble 306 having a columnar shape, for example. The gas bubble 306 covers a part of the first electrode 301. The gas bubble 306 is a single large-sized gas bubble that is formed over a certain distance from the opening 305 of the insulator 302 without interruption, for example. Stated in another way, with the supply of the gas, the gas flows through the gap 304 between the first electrode 301 and the insulator 302, and the first electrode 301 is held in a state always covered with the gas. Moreover, the gas supplied to the gap 304 is let out from the opening 305 of the insulator 302, thus forming the columnar gas bubble 306.

The power supply 105 applies the high-frequency AC voltage between the first electrode 301 and the second electrode 104. When the application of the high-frequency AC voltage between the first electrode 301 and the second electrode 104, the plasma 307 is generated inside the gas bubble 306 from the vicinity of the first electrode 301. The plasma 307 is generated over a wide region including not only the inside of the gas bubble 306 near the end of the first electrode 301, but also the gap 304 inside the insulator 302.

Moreover, as in the first embodiment, when the high-frequency AC voltage is applied between the first electrode 301 and the second electrode 104, the dielectric partition wall 102 disposed in the treatment tank 101 is charged to be positive and negative alternatively. More specifically, when the wall surface of the dielectric partition wall 102 at the second space side is charged to be negative, the wall surface at the first space side is charged to be positive and thereby a positive electric field is formed in the first space 106. Since bacteria in the water to be treated is negatively charged, they are attracted by the positive electric field to adhere to the wall surface of the dielectric partition wall 102. The liquid treatment apparatus 300 carries out the sterilization by causing the radicals, which have been produced by the plasma 307, to collide against the bacteria adhering to the wall surface of the dielectric partition wall 102.

Advantageous Effects

In the liquid treatment apparatus 300 according to the third embodiment, the plasma 307 can be efficiently generated and thus radicals having long lifetimes can be produced with the above-described configuration of the first electrode 301 and the vicinity thereof. Furthermore, when the high-frequency AC voltage is applied between the first electrode 301 and the second electrode 104 from the power supply 105, the dielectric partition wall 102 is charged to be positive, thus causing the bacteria to adhere to the wall surface of the dielectric partition wall 102. Hence the liquid treatment apparatus 300 can make the radicals, which have been produced by the plasma 307, collide against the bacteria adhering to the dielectric partition wall 102 with high efficiency, and thus can treat the water to be treated in a short time.

Fourth Embodiment

A liquid treatment apparatus 400 according to a fourth embodiment will be described below.

Figure 8:
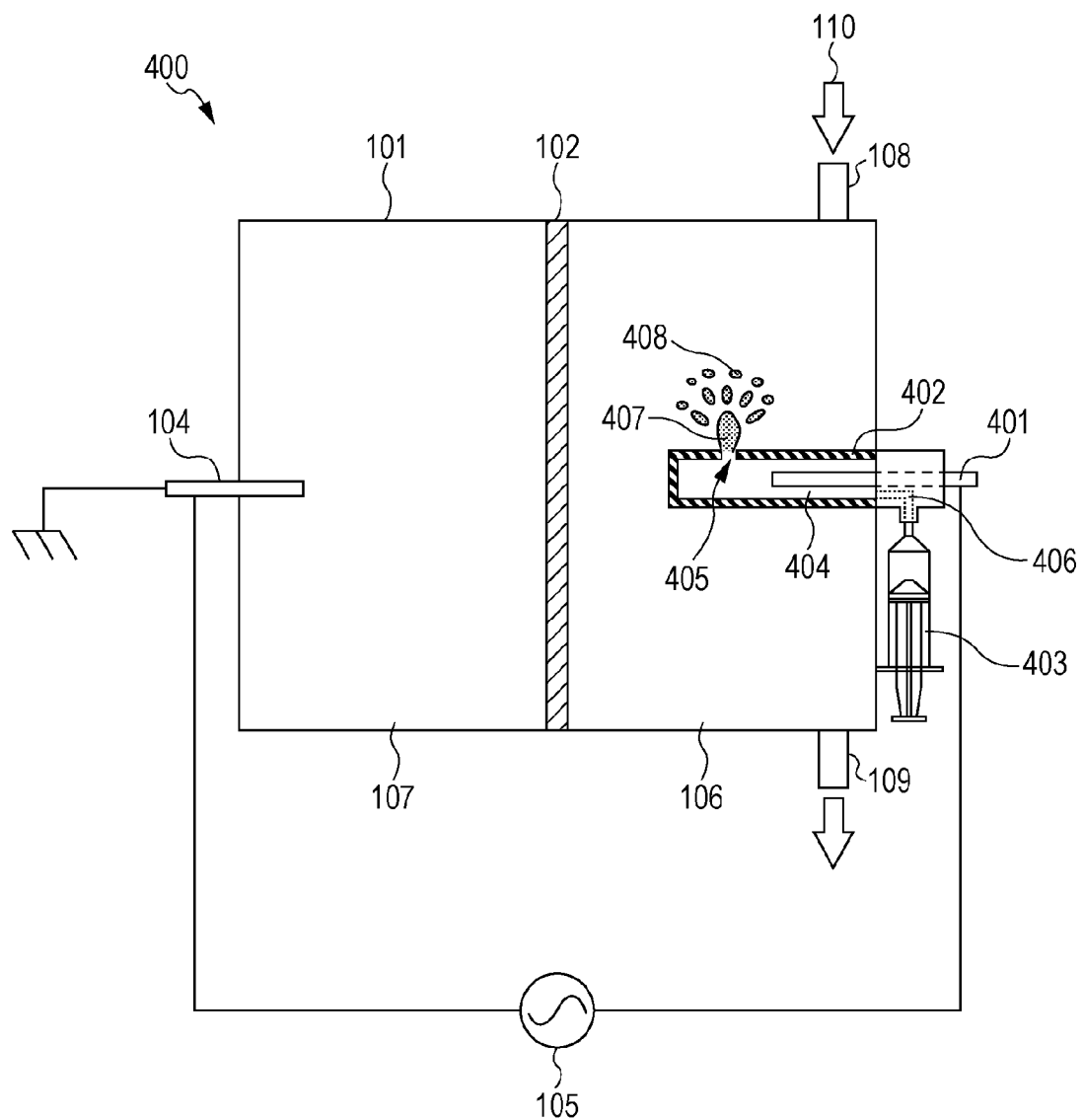
FIG. 8 is a schematic view illustrating one example of an overall configuration of a liquid treatment apparatus according to a fourth embodiment of the present disclosure.

FIG. 8 is a schematic view illustrating one example of an overall configuration of the liquid treatment apparatus 400 according to the fourth embodiment. As illustrated in FIG. 8, the configuration of a first electrode 401 and the vicinity thereof in the fourth embodiment is different from that in the second embodiment in a point of including a gas purging apparatus 403. The other configuration of the fourth embodiment is the same as that in the second embodiment. The configuration of the first electrode 401 and the vicinity thereof in the fourth embodiment will be described below.

[Fourth Configuration of First Electrode and Vicinity Thereof]

As illustrated in FIG. 8, the configuration of the first electrode 401 and the vicinity thereof includes the first electrode 401, an insulator 402, and the gas purging apparatus 403. The first electrode 401 has a circular columnar shape, for example. The insulator 402 is arranged around the first electrode 401 with a gap 404 between the insulator 402 and an outer periphery of the first electrode 401. An opening 405 is formed in the insulator 402. The gas purging apparatus 403 purges gas in the gap 404 between the first electrode 401 and the insulator 402. The gas purging apparatus 403 can be constituted using a syringe, a pump or the like. The gas purging apparatus 403 purges the gas, through a flow passage 406, from the gap 404 between the first electrode 401 and the insulator 402, such that the gap 404 is filled with the water to be treated in the treatment tank 101. In such a state, the power supply 105 applies the high-frequency AC voltage between the first electrode 401 and the second electrode 104. Upon the high-frequency AC voltage being applied between the first electrode 401 and the second electrode 104, the water to be treated in the gap 404 is vaporized to produce gas. When the gas passes through the opening 405 of the insulator 402, discharge occurs, whereby plasma 407 is generated.

[Operation (Liquid Treatment Method)]

One example of the liquid treatment method according to the fourth embodiment, i.e., one example of the operation of the liquid treatment apparatus 400 according to the fourth embodiment, will be described below.

Prior to starting the liquid treatment, the electrolytic solution is filled into the second space 107 within the treatment tank 101.

Furthermore, prior to starting the liquid treatment, the water to be treated is filled into the first space 106 within the treatment tank 101.

In an initial stage before the occurrence of discharge, the gas purging apparatus 403 purges the gas remaining in the gap 404 between the first electrode 401 and the insulator 402. The gas purging apparatus 403 is constituted, for example, to purge the gas remaining in the gap 404 by reducing pressure in the gas purging apparatus 403. Alternatively, the gas in the gap 404 may be purged by injecting a liquid into the gap 404 from the gas purging apparatus 403.

In the case of injecting a liquid into the gap 404 from the gas purging apparatus 403, the liquid is, e.g., tap water or distilled water.

The power supply 105 applies the high-frequency AC voltage between the first electrode 401 and the second electrode 104.

The liquid in the gap 404 is heated by power applied from the first electrode 401, and thereby gas vaporized from the liquid is produced in the gap 404. The gas is aggregated into a mass in the gap 404. Due to a pressure difference between pressure in the gap 404 and pressure in the first space 106 of the treatment tank 101, the gaseous mass is let out from the opening 405 of the insulator 402 into the water to be treated, which is present in the first space 106 of the treatment tank 101.

On that occasion, the liquid vaporized in the gap 404 may be the liquid injected by the gas purging apparatus 403, the water to be treated, or a mixture of the injected liquid and the water to be treated.

When the gas passes through the opening 405 of the insulator 402, the liquid in the vicinity of the opening 405 is replaced with the gas, and the gas surrounded by the water to be treated, i.e., a gas bubble, is formed. Thus, the gas bubble insulates a conducting path from the first electrode 401 to the water to be treated. At that time, the high-frequency AC voltage from the power supply 105 is applied to the gas bubble in the opening 405, and thereby discharge occurs in the gas bubble due to concentration of an electric field. As a result, the plasma 407 is generated inside the gas bubble. Once the plasma 407 is generated, the plasma 407 is successively and continuously generated. The gas bubble containing the plasma 407 is let out from the opening 405 of the insulator 402 into the water to be treated. The gas bubble containing the plasma 407 comes into a state protruding from the opening 405 formed in the insulator 402 into the water to be treated, which is present in the first space 106 of the treatment tank 101.

Small parts of the gas bubble protruding from the opening 405 of the insulator 402 are separated from a main part, whereby a plurality of gas bubbles 408 is formed. The plural gas bubbles 408 are diffused into the water to be treated, which is present in the first space 106 of the treatment tank 101. The gas bubbles 408 contain electrons, ions, or radicals produced by the plasma 407. With the aid of the gas bubbles 408, the liquid treatment apparatus 400 can sterilize the water to be treated and/or decompose chemical substances contained in the water to be treated.

As in the first embodiment, when the high-frequency AC voltage is applied between the first electrode 401 and the second electrode 104, the dielectric partition wall 102 disposed in the treatment tank 101 is charged to be positive and negative alternatively. More specifically, when the wall surface of the dielectric partition wall 102 at the second space side is charged to be negative, the wall surface at the first space side is charged to be positive and thereby a positive electric field is formed in the first space 106. Since bacteria in the water to be treated are negatively charged, they are attracted by the positive electric field to adhere to the wall surface of the dielectric partition wall 102. The liquid treatment apparatus 400 carries out the sterilization by causing the radicals, which have been produced by the plasma 407, to collide against the bacteria adhering to the wall surface of the dielectric partition wall 102.

Advantageous Effects

In the liquid treatment apparatus 400 according to the fourth embodiment, the gas purging apparatus 403 purges the gas in the gap 404 between the first electrode 401 and the insulator 402. If discharge occurs in the condition where the gas remains in the gap 404, there is a possibility that nitrogen ions may be generated. The nitrogen ions tend to scavenge (erode or purge) oxygen-based radicals, such as OH. In contrast, the liquid treatment apparatus 400 can suppress generation of the nitrogen ions by purging the residual gas. Therefore, the oxygen-based radicals can be held in the treatment tank 101 in a larger number for a longer time. Thus, the liquid treatment apparatus 400 can produce pure oxygen-based radicals which are safe for living bodies. Moreover, when the high-frequency AC voltage is applied between the first electrode 401 and the second electrode 104 from the power supply 105, the wall surface of the dielectric partition wall 102 at the first space side is charged to be positive, thus causing the bacteria, which are present in the water to be treated, to adhere to the wall surface of the dielectric partition wall 102. Hence the liquid treatment apparatus 400 can make the radicals, which have been produced by the plasma 407, collide against the bacteria adhering to the wall surface of the dielectric partition wall 102 with high efficiency, and thus can treat the water to be treated in a short time.

As described in the first to fourth embodiments, in the liquid treatment apparatus according to the present disclosure, the dielectric partition wall is disposed in the treatment tank, and the high-frequency AC voltage is applied between the first electrode and the second electrode. With such an arrangement, when the high-frequency AC voltage is applied between the first electrode and the second electrode from the power supply, the wall surface of the dielectric partition wall at the first space side is charged to be positive. As a result, the bacteria in the water to be treated can be attracted toward the dielectric partition wall, such that the bacteria adhere to the wall surface of the dielectric partition wall. In addition, the liquid treatment apparatus according to the present disclosure can employ various types of configurations of the first electrode and the vicinity thereof. For instance, the configuration of the first electrode 103 and the vicinity thereof may be designed so as to produce radicals by generating plasma in the water to be treated.

The liquid treatment apparatus according to the present disclosure can make the radicals, which have been produced in the water to be treated, collide against the bacteria adhering to the wall surface of the dielectric partition wall with high efficiency, and thus can sterilize the water to be treated at a high speed (i.e., can realize one-pass sterilization). In other words, the liquid treatment apparatus according to the present disclosure can treat a liquid in a short time. In particular, the bacteria in the water to be treated can be killed at a higher speed by grounding the second electrode.

The first to fourth embodiments have been described above in connection with the examples having the different configurations of the first electrode and the vicinity thereof. However, the liquid treatment apparatus according to the present disclosure is not limited to the configurations of the first electrode and the vicinity thereof, which have been described in the first to fourth embodiments, and it can be practiced by employing various configurations. The configuration of the first electrode and the vicinity thereof is just required to be at least able to produce products capable of decomposing bacteria, e.g., radicals, in the water to be treated. The liquid treatment apparatus may include, for example, only the first electrode as the configuration of the first electrode and the vicinity thereof, as illustrated in FIG. 1. Furthermore, the liquid treatment apparatus may include a plurality of first electrodes. In the case including only the first electrode, an amount of radicals produced in the water to be treated is reduced in comparison with those in the first to fourth embodiments, but the liquid treatment can be performed in practice. In the case using a plurality of first electrodes, plasma can be generated with higher efficiency, and thus the liquid treatment can be progressed in a shorter time.

The shape and the size of the first electrode are optionally selectable. The first electrode may have any suitable shape, such as a circular cylindrical shape, a circular columnar shape, a rectangular parallelepiped shape, or a planar shape. The size of the first electrode is just required to be able to generate plasma. The first electrode may have a diameter of 2 mm or less, for example. The shape and the size of the first electrode may be optionally determined depending on the configuration of the first electrode and the vicinity thereof (including the insulator, the gas supplying apparatus, etc.). Similarly, the shape and the size of the second electrode are also optionally selectable.

The shape and the size of the insulator can be optionally determined, and may be determined in conformity with the shape and/or the size of the first electrode. While one opening is formed in the insulator in the first to fourth embodiments, the number of opening is not limited to one and a plurality of openings may be formed. The position of the opening is also not limited to particular one.

The liquid treatment apparatus according to the present disclosure can be practiced in any of suitable forms. For instance, a liquid treatment method is carried out by employing the liquid treatment apparatus according to the present disclosure. The liquid treatment method can produce radicals in the water to be treated while causing bacteria to adhere to the dielectric partition wall. Accordingly, the radicals produced in the water to be treated can be collided against the bacteria with high efficiency, and thus the bacteria in the water to be treated can be killed at a high speed. As a result, with the liquid treatment method carried out using the liquid treatment apparatus according to the present disclosure, the water to be treated can be treated in a short time.

The liquid treatment apparatus and the liquid treatment method according to the present disclosure can be used, for example, to treat liquids containing bacteria. The liquid treatment apparatus according to the present disclosure is useful when applied to a water purifier, a washing machine, a pot, an air purifier, etc.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A liquid treatment apparatus for treating water to be treated, the liquid treatment apparatus comprising:
   a treatment tank;
   a dielectric partition wall dividing inside of the treatment tank into a first space in which the water to be treated is injected, and a second space in which an electrolytic solution is filled;
   at least one first electrode at least part of which is arranged in the first space of the treatment tank;
   a second electrode of at least part which is arranged in the second space of the treatment tank; and
   a power supply that applies an AC voltage having a frequency of 1 kHz or more between the first electrode and the second electrode,
   wherein the dielectric partition wall has a surface including a plurality of stepped faces on a side of the first space.

2. The liquid treatment apparatus according to claim 1, wherein the dielectric partition wall blocks off inflow of the water to be treated into the second space and inflow of the electrolytic solution into the first space.

3. The liquid treatment apparatus according to claim 1, wherein the second electrode is grounded.

4. The liquid treatment apparatus according to claim 1, wherein:
   the treatment tank includes:
      an inlet through which the water to be treated is injected to the first space; and
      an outlet through which the water having been treated is drained from the first space,
   the inlet is arranged in a first surface of the treatment tank, and
   the outlet is arranged in a second surface of the treatment tank, the second surface opposing to the first surface, the outlet being located at a different position from an extension line extending from the inlet into a direction of injecting the water to be treated.

5. The liquid treatment apparatus according to claim 1, wherein the treatment tank includes a gas bleeding hole in the second space.

6. The liquid treatment apparatus according to claim 1, wherein the at least one first electrode comprises a plurality of first electrodes.

7. The liquid treatment apparatus according to claim 1, wherein the power supply applies a bipolar pulse voltage.

8. The liquid treatment apparatus according to claim 1, further comprising a gas supplying apparatus that supplies gas into the water to be treated from outside of the treatment tank, the water to be treated being present in the first space of the treatment tank.

9. The liquid treatment apparatus according to claim 8, wherein:
the gas supplying apparatus supplies the gas into the water to be treated, generating a gas bubble that surrounds a conductive region, which is exposed to the first space, of the first electrode, and
the power supply applies the AC voltage between the first electrode and the second electrode, causing discharge in the gas bubble and generating plasma.

10. The liquid treatment apparatus according to claim 9, further comprising an insulator in contact with an outer peripheral surface of the first electrode,
wherein the first electrode has a hollow cylindrical shape with an opening through which a hollow space defined by an inner peripheral surface of the first electrode communicates with the first space of the treatment tank,
the gas supplying apparatus supplies the gas into the water to be treated through the hollow space and the opening of the first electrode, and
the conductive region of the first electrode is not covered with the insulator.

11. The liquid treatment apparatus according to claim 1, further comprising an insulator surrounding a periphery of the first electrode with a gap between the insulator and the periphery of the first electrode, the insulator including an opening through which the gap communicates with the first space of the treatment tank.

12. The liquid treatment apparatus according to claim 11, wherein:
the power supply applies the AC voltage between the first electrode and the second electrode, to vaporize a liquid in the gap to produce gas, and
the application of the power supply causes discharge in a gas bubble to generate plasma, when the gas is let out as the gas bubble from the opening into the water to be treated, the water to be treated being present in the first space of the treatment tank.

13. The liquid treatment apparatus according to claim 11, further comprising a gas supplying apparatus that supplies gas to the gap.

14. The liquid treatment apparatus according to claim 13, wherein:
the gas supplying apparatus supplies the gas into the water to be treated through the gap and the opening of the insulator, generating a gas bubble in the water to be treated, the water to be treated being present in the first space of the treatment tank, and
the power supply applies the AC voltage between the first electrode and the second electrode, causing discharge in the gas bubble to generate plasma.

15. A liquid treatment apparatus for treating water to be treated, the liquid treatment apparatus comprising:
a treatment tank;
a dielectric partition wall dividing inside of the treatment tank into a first space in which the water to be treated is injected, and a second space in which an electrolytic solution is filled;
at least one first electrode at least part of which is arranged in the first space of the treatment tank;
a second electrode of at least part which is arranged in the second space of the treatment tank;
a power supply that applies an AC voltage between the first electrode and the second electrode;
an insulator surrounding a periphery of the first electrode with a gap between the insulator and the periphery of the first electrode, the insulator including an opening through which the gap communicates with the first space of the treatment tank; and
a gas purging apparatus that purges the gas remaining in the gap prior to starting the treatment of the water to be treated.

16. A liquid treatment apparatus for treating water to be treated, the liquid treatment apparatus comprising:
a treatment tank;
a dielectric partition wall dividing inside of the treatment tank into a first space in which the water to be treated is injected, and a second space in which an electrolytic solution is filled;
at least one first electrode at least part of which is arranged in the first space of the treatment tank;
a second electrode of at least part which is arranged in the second space of the treatment tank; and
a power supply that applies an AC voltage having a frequency of 1 kHz or more between the first electrode and the second electrode,
wherein the dielectric partition wall has a surface including a plurality of stepped faces that are exposed to the first space.

17. The liquid treatment apparatus according to claim 16, wherein the plurality of stepped faces are arranged on the surface in a matrix configuration.

18. The liquid treatment apparatus according to claim 16, wherein depths or heights of the plurality of stepped face are each in a range from 0.1 mm to 3 mm.

19. The liquid treatment apparatus according to claim 1, wherein the dielectric partition wall is made of acrylic resin, polycarbonate, polyvinylidene fluoride, or barium titanate.

* * * * *